US011247392B2

(12) United States Patent
Zhang et al.

(10) Patent No.: US 11,247,392 B2
(45) Date of Patent: Feb. 15, 2022

(54) FORMING SYSTEM AND METHOD OF HYBRID ADDITIVE MANUFACTURING AND SURFACE COATING

(71) Applicant: Huazhong University of Science and Technology, Wuhan (CN)

(72) Inventors: Haiou Zhang, Wuhan (CN); Xiaoqi Hu, Wuhan (CN); Fusheng Dai, Wuhan (CN); Guilan Wang, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 0 days.

(21) Appl. No.: 17/005,865

(22) Filed: Aug. 28, 2020

(65) Prior Publication Data

US 2021/0060856 A1    Mar. 4, 2021

(30) Foreign Application Priority Data

Aug. 29, 2019    (CN) .......................... 201910809421.1

(51) Int. Cl.
*B29C 64/153*    (2017.01)
*B29C 64/314*    (2017.01)
(Continued)

(52) U.S. Cl.
CPC .......... *B29C 64/153* (2017.08); *B29C 64/188* (2017.08); *B29C 64/245* (2017.08);
(Continued)

(58) Field of Classification Search
CPC ... B29C 64/153; B29C 64/314; B29C 64/188; B29C 64/245; B29C 64/255; B22F 12/00; B22F 10/20; B22F 10/10
See application file for complete search history.

(56) References Cited

U.S. PATENT DOCUMENTS

2014/0234551 A1\* 8/2014 Sparkes ................. C23C 24/04
427/554
2015/0159257 A1\* 6/2015 Lin .......................... C23C 4/12
501/1
(Continued)

OTHER PUBLICATIONS

Fan, B., et al. Patent Analysis on Technology Development of CVD Diamond Film. [J] Vacuum 53(5): 37-40 (2016).
(Continued)

*Primary Examiner* — Nahida Sultana
(74) *Attorney, Agent, or Firm* — Brian S. Boyer; Syndicated Law, PC

(57) ABSTRACT

The present invention belongs to the field of multi-material additive manufacturing (AM), and in particular discloses a forming system and method of hybrid AM and surface coating. The hybrid forming system includes an additive forming device, a laser-assisted cold spraying (LACS) device and a workbench. The additive forming device and the LACS device are located above the workbench. During manufacturing, the additive forming device forms a part to be formed on the workbench layer by layer, and the LACS device performs coating peening treatment on inner and outer surfaces of the part to be formed during the forming process, thereby jointly completing the composite manufacturing of the part to be formed. The present invention makes (Continued)

full use of the rapid prototyping advantage of the short-flow AM process, and integrates the surface coating peening process into the hybrid forming system.

9 Claims, 2 Drawing Sheets

(51) Int. Cl.
  *B29C 64/188* (2017.01)
  *B29C 64/245* (2017.01)
  *B29C 64/255* (2017.01)
  *B33Y 10/00* (2015.01)
  *B33Y 30/00* (2015.01)
  *B33Y 40/10* (2020.01)

(52) U.S. Cl.
  CPC .......... *B29C 64/255* (2017.08); *B29C 64/314* (2017.08); *B33Y 10/00* (2014.12); *B33Y 30/00* (2014.12); *B33Y 40/10* (2020.01)

(56) References Cited

U.S. PATENT DOCUMENTS

| | | |
|---|---|---|
| 2016/0047052 A1 | 2/2016 | Baranovski et al. |
| 2018/0180125 A1* | 6/2018 | Hollis ..................... C23C 24/04 |
| 2019/0009300 A1* | 1/2019 | Mahalingam ......... C23C 28/022 |
| 2019/0235477 A1* | 8/2019 | Widener ................. C22C 38/02 |
| 2020/0108870 A1* | 4/2020 | Cho ..................... B62D 21/152 |

OTHER PUBLICATIONS

Li, W., et al. Application Research Status of Cold Spraying in the Field of Additive Manufacturing and Repair/Remanufacturing. [J] Welding 73(4): 2-8 (2016).

Liu, J., et al. Properties of Electro-spark Deposition Coating and Its Applications. 7th National Surface Engineering Conference and the 2nd Surface Engineering Youth Academic Forum Proceedings p. 123-126 (2008).

Matz, J.E., et al. Carbide formation In Alloy 718 during electron-beam solid freeform fabrication. Metallurgical and Materials Transactions A: Physical Metallurgy and Materials Science 33(8): 2559-2567 (2002).

Pawlowski, L. The science and engineering of thermal spray coatings, second edition [M]. p. 15 (2008).

Pinkerton, A.J., et al. Effects of Geometry and Composition in Coaxial Laser Deposition Of 316L Steel for Rapid Prototyping. Annals Of the CIRP 52(1): 181-184 (2003).

Zhang, H., et al. Study on Microstructure of Superalloy Parts Directly Formed by Plasma Deposition. Journal of Huazhong University of Science and Technology (Natural Sciences) 33(11): 54-56 (2005).

Zhang, H., et al. Fundamental Study on Plasma Deposition Manufacturing. Surface and Coating Technology 171: 112-118 (2003).

* cited by examiner

US 11,247,392 B2

FORMING SYSTEM AND METHOD OF HYBRID ADDITIVE MANUFACTURING AND SURFACE COATING

CROSS REFERENCE TO RELATED APPLICATION

This application claims the priority benefit of Chinese Patent Application No. 201910809421.1, filed Aug. 29, 2019, which is hereby incorporated herein by reference in its entirety.

TECHNICAL FIELD

The present invention belongs to the field of multi-material additive manufacturing (AM), and in particular relates to a forming system and method of hybrid AM and surface coating.

BACKGROUND

Additive manufacturing (AM) processes of complex structure parts mainly include laser deposition technology (LDT), electron-beam freeform fabrication (EBF$^3$) and plasma arc deposition (PAD).

The LDT uses a high-power laser to melt the metal powder sent to the substrate layer by layer and quickly solidify the deposit to form a near-net-shape (NNS) part. The method has high forming precision and higher workpiece density than that of the selective laser sintering (SLS) process. However, its forming efficiency and energy/material utilization are low, the equipment investment and operating costs are high, and it is not easy to achieve full density. (A. J. Pinkkerton, L. Li, *Effects of Geometry and Composition in Coaxial Laser Deposition Of 316 L Steel for Rapid Prototyping*, Annals Of the CIRP, Vol. 52,1(2003), p 181-184).

The EBF$^3$ process uses a high-power electron beam to melt the powder material. It applies an electromagnetic field according to the computer model and controls the movement of the electron beam to scan layer by layer until the entire part is formed. This method has high forming precision and good forming quality. However, the process conditions are strict, and the entire forming process needs to be performed in a vacuum, which results in limited forming dimensions and high equipment investment and operating costs. In addition, because it uses the same layer-by-layer powder spreading method as SLS, it is difficult to form a part from a functionally graded material (FGM). (Matz J. E., Eagar T. W. *Carbide formation In Alloy* 718 *during electron-beam solid freeform fabrication*. Metallurgical and Materials Transactions A: Physical Metallurgy and Materials Science, 2002, v33(8): p 2559-2567).

The PAD uses a highly-compressed and well-concentrated plasma beam to melt the metal powder or filament that is synchronously supplied, so that the material is deposited on the substrate layer by layer to form a metal part or mold. Compared with the previous two methods, the PAD process has high forming efficiency, high material utilization, low equipment investment and low operating costs, and is easy to achieve full density. However, due to the larger diameter of the plasma plume, the formed size and surface accuracy are not as high as these of the previous two methods. Therefore, like LDT, this method requires finish machining after forming. (Haiou Zhang, Jipeng Xu, Guilan Wang: *Fundamental Study on Plasma Deposition Manufacturing*, Surface and Coating Technology, v. 171 (1-3) 2003, pp. 112-118; Haiou Zhang, Hongjun Wu, Guilan Wang, Jing Chen: *Study on Microstructure of Superalloy Parts Directly Formed by Plasma Deposition*, Journal of Huazhong University of Science and Technology (Natural Sciences), v33, n11, 2005, p 54-56).

However, the direct forming process will increase the surface hardness of the difficult-to-machine part due to rapid solidification, making it more difficult to machine. Besides, since the complex-shaped part needs to be clamped multiple times, the processing time is prolonged, sometimes even accounting for more than 60% of the entire manufacturing cycle. This has become a bottleneck for the low-cost, short-flow manufacturing of high-performance difficult-to-machine parts.

The existing surface peening measures for the formed part mainly include thermal spraying (TS), cold spraying (CS), electrospark deposition (ESD) and vapor deposition (VD).

In the TS process, heat sources such as plasma arc, electric arc and flame are used to heat the powder or filament to a molten, semi-melted or hot solid state, and the sprayed particles are carried in the compressed gas to form a high-speed jet that collides with the substrate and deposits to form a coating with a certain special function. (Pawlowski L. *The science and engineering of thermal spray coatings*, second edition [M]. New York: John Wiley & Sons, 2008:15). As one of the key supporting technologies of remanufacturing engineering, the TS process has the advantages of wide range of sprayable materials, unlimited substrate, fast deposition speed, high flexibility, and controllable heating temperature of the workpiece. It is mainly used to realize the surface protection, dimensional restoration and AM of the part, and has broad application prospects in aerospace, gas turbine, petrochemical, transportation and other fields. (Baranovski V E, Baranovski A V. *Gas dynamic cold spray method and apparatus*: US, 20160047052 [P] 2016-02-18).

The CS process is a metal and ceramic spraying process. Unlike traditional TS, the CS process does not need to melt the metal particles before spraying. The high-pressure gas is used as the accelerating medium and sent to the spray gun, and at the same time, the sprayed powder is sent to the spray gun through the powder feeding gas. After being accelerated by the specially designed De Laval shrink-expansion nozzle, a supersonic gas-solid flow is formed. The sprayed particles collide with the substrate in the solid state, and undergo severe plastic deformation to deposit to form a coating. (Wenya Li, Zhang Dongdong, Chunjie Huang, Xueping Guo. *Application Research Status of Cold Spraying in the Field of Additive Manufacturing and Repair/Remanufacturing* [J]. Welding, 2016, (4): 2-8, 73). As a new type of solid coating preparation method, the CS process has outstanding advantages in preparing high-performance metal or metal matrix composite coatings.

The ESD process uses a pulse spark discharge between the electrode material and the surface of the metal workpiece to infiltrate the conductive material as the electrode into the metal surface to form a deposit layer with high hardness, high wear resistance and good physical and chemical properties. It has broad applications in local peening and repair of molds, cutting tools and large mechanical parts. (Jiyan Liu, Shining Ma, Changqing Li, et al. *Properties and Applications of ESD Coating* [C], the 7$^{th}$ National Surface Engineering Conference and the 2$^{nd}$ Surface Engineering Youth Academic Forum Proceedings, 2008: 123-126).

Chemical vapor deposition (CVD) is a process that applies gaseous substances to chemical reactions on solids to produce solid deposits. It mainly includes the process of forming volatile substances, transferring them to the deposition zone, and finally generating chemical reactions on the solids and producing solid substances. It plays an important role in the formation of precious metal films and coatings. (Baohu Fan, Bonan Peng, Hengchao Zhang. *Patent Analysis on Technology Development of CVD Diamond Film* [J]. Vacuum, 2016 (05): 37-40).

The above four surface peening processes improve the surface properties of parts and molds from different perspectives. However, they are still difficult to obtain coatings with large thicknesses and density, and the coatings obtained are prone to oxidation and phase change. Therefore, they cannot meet the requirements of the current high-end aerospace parts for short-flow manufacturing and high-temperature corrosion resistance.

In addition, the complex structure parts in the aerospace, energy and power industries have high requirements on the microstructure and surface properties. Featuring rapid heating, rapid solidification and free growth, the existing mold-less AM method is difficult to avoid cracks and porosity during the additive forming process. In addition, since the surface coating process is carried out after the AM of the part is completed, it is difficult to carry out surface coating for the complex part, and the coating effect is poor, leading to unsatisfactory microstructure and surface properties of the part. The above problems have become the bottleneck that restricts the further development of short-flow directed energy deposition (DED) and the realization of industrial application. Therefore, there is a need to develop a new method to effectively improve the manufacturing efficiency, formability, microstructure and surface properties of the part.

SUMMARY

In view of the above defects or improvement requirements of the prior art, the present invention provides a forming system and method of hybrid additive manufacturing (AM) and surface coating. In the process of forming a part to be formed by an additive forming device layer by layer, the surface peening treatment of the part is performed by a laser-assisted cold spraying (LACS) device. The present invention improves the hybrid forming efficiency of AM and surface peening of the part, and overcomes the technical bottleneck of direct AM and surface coating hybrid forming for parts of complex structure with high surface peening requirements.

In order to achieve the above objective, one aspect of the present invention proposes a forming system of hybrid AM and surface coating. The hybrid forming system includes an additive forming device, an LACS device and a workbench, where the additive forming device and the LACS device are located above the workbench; during manufacturing, the additive forming device forms a part to be formed on the workbench layer by layer, and the LACS device performs coating peening treatment on inner and outer surfaces of the part to be formed during the forming process, thereby jointly completing the composite manufacturing of the part to be formed.

As a further preferred aspect, the LACS device includes a gas compression and drying unit, a powder storage and feeding unit and a ring-shaped laser unit that are sequentially connected; during manufacturing, a coating powder material in the powder storage and feeding unit is compressed and dried by the gas compression and drying unit, sent to the ring-shaped laser unit, then heated by the ring-shaped laser unit, and coated on the inner and outer surfaces of the part to be formed.

As a further preferred aspect, the powder storage and feeding unit includes two or more powder storage and feeding tanks.

As a further preferred aspect, a powder feeding rate of the powder storage and feeding unit is 40-70 g/min, a powder particle size is 5-60 µm, and a preheating temperature is 400-800° C.

As a further preferred aspect, the hybrid forming system further includes a micro-rolling device and a milling and grinding compound device; the micro-rolling device and the milling and grinding compound device are located above the workbench; the micro-rolling device and the milling and grinding compound device perform finish machining on the part to be formed during the process of forming the part to be formed layer by layer by the additive forming device.

Another aspect of the present invention proposes a forming method of hybrid AM and surface coating, which is implemented by using the above system, and includes the following steps:
S1: presetting an additive forming trajectory and a coating peening trajectory according to a three-dimensional (3D) model of a part to be formed;
S2: enabling an additive forming device to form a multi-layer part to be formed on a workbench layer by layer according to the preset additive forming trajectory, and enabling an LACS device to perform coating peening treatment on inner and outer surfaces of the part to be formed according to the preset coating peening trajectory; and
S3: repeating S2 several times until the manufacturing of the part is completed.

Overall, compared with the prior art, the above technical solutions of the present invention mainly have the following technical advantages:
1. In the present invention, during the short-flow AM and surface peening composite processing of the part, the outer surface or inner cavity of the part to be formed is subject to coating peening layer by layer or every other layer during the additive forming process. In the traditional method, the surface coating process is carried out after the AM of the part is completed, which has problems such as difficult coating and poor coating effect for the complex part. The present invention effectively overcomes the technical bottleneck of direct AM and surface coating hybrid forming for the current aeroengines and other parts with a complex inner cavity or outer wall structure and high surface peening requirements.
2. The present invention makes full use of the rapid prototyping advantage of the short-flow AM, and integrates the surface coating peening process into the hybrid forming system to simultaneously perform surface peening treatment on the formed part. The present invention improves the hybrid forming efficiency of AM and surface peening of the part, and greatly shortens the cycle of direct short-flow AM of the current complex metal parts that require surface peening.
3. The part produced by using the system of the present invention has excellent microstructure, meets the performance standards of forgings, and avoids the occurrence of unfavorable features such as pores, slag inclusion, shrinkage cavity, incomplete fusion, phase change, cracking and flow. The present invention adopts different AM heat sources to adapt to diversified materials for direct AM, and adopts an adjustable LACS surface peening process to adapt to a variety of coatings. By utilizing the high-energy heat source of laser, the present invention obtains a coating with a larger thickness and achieves better surface peening performance. In addition, the present invention overcomes the problem that the surface of the cold-sprayed coating is tapered, resulting in a linear decrease in the deposition rate and an increase in the equipment and operating costs.

4. The system of the present invention combines an additive forming device, a LACS device, a micro-rolling device and a milling and grinding compound device. The prepared part directly meets the requirements of use, without the need for subsequent finishing and surface peening processes, achieving rapid prototyping that meets the comprehensive requirements of morphology and performance.

5. In the present invention, the powder storage and feeding unit is composed of a plurality of powder storage and feeding tanks, and a powder feeding servo motor realizes the precise control of the powder feeding amount, realizing the coating of functionally gradient materials (FGM) or composite materials.

Figure 1:
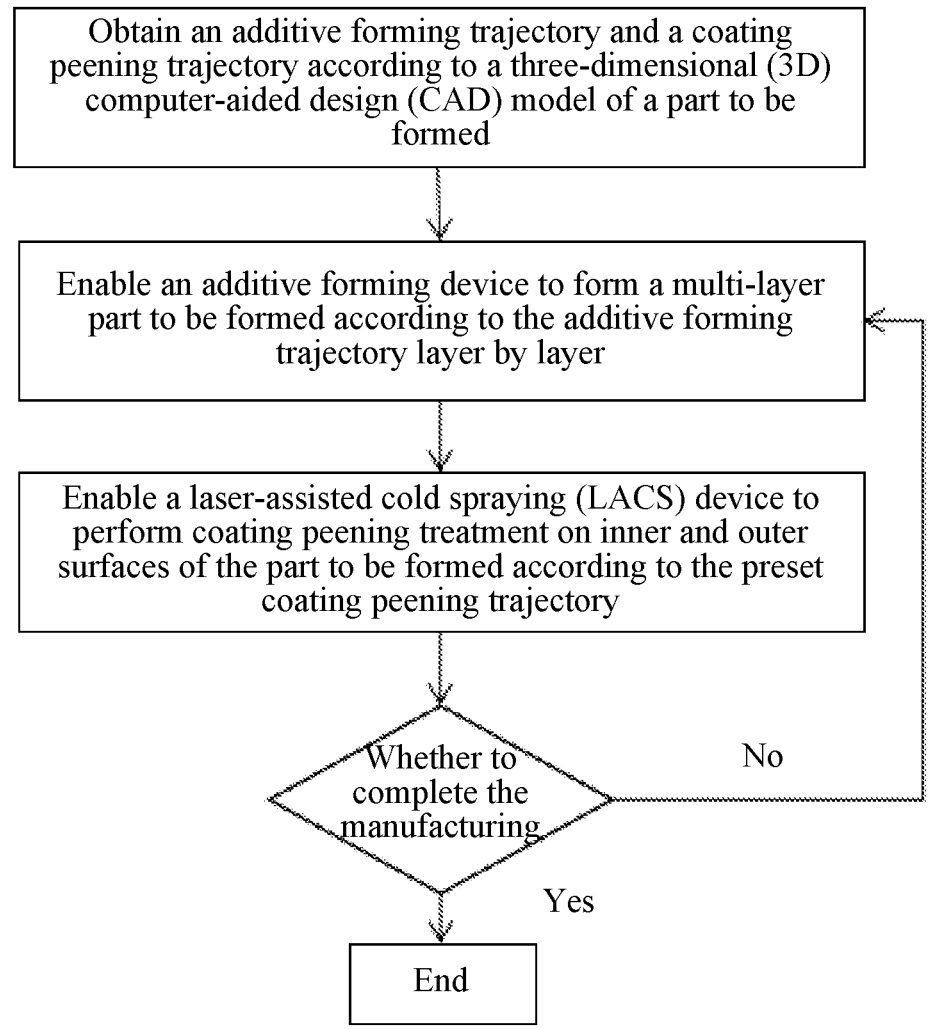
FIG. 1 is a flowchart of a forming method of hybrid additive manufacturing (AM) and surface coating with according to an example of the present invention.

In all the drawings, the same reference numerals are used to denote the same elements or structures, where: 1. workbench; 2. substrate; 3. milling and grinding compound device; 4. micro-rolling device; 5. part to be formed; 6. inner and outer surfaces of part to be formed; 7. additive forming device; 8. additive forming surface; and 9. laser-assisted cold spraying (LACS) device.

DETAILED DESCRIPTION

To make the objectives, technical solutions and advantages of the present invention clearer, the present invention is described in further detail below with reference to the accompanying drawings and examples. It should be understood that the examples described herein are merely intended to explain the present invention, rather than to limit the present invention. Further, the technical features involved in the various examples of the present invention described below may be combined with each other as long as they do not constitute a conflict with each other.

Figure 2:
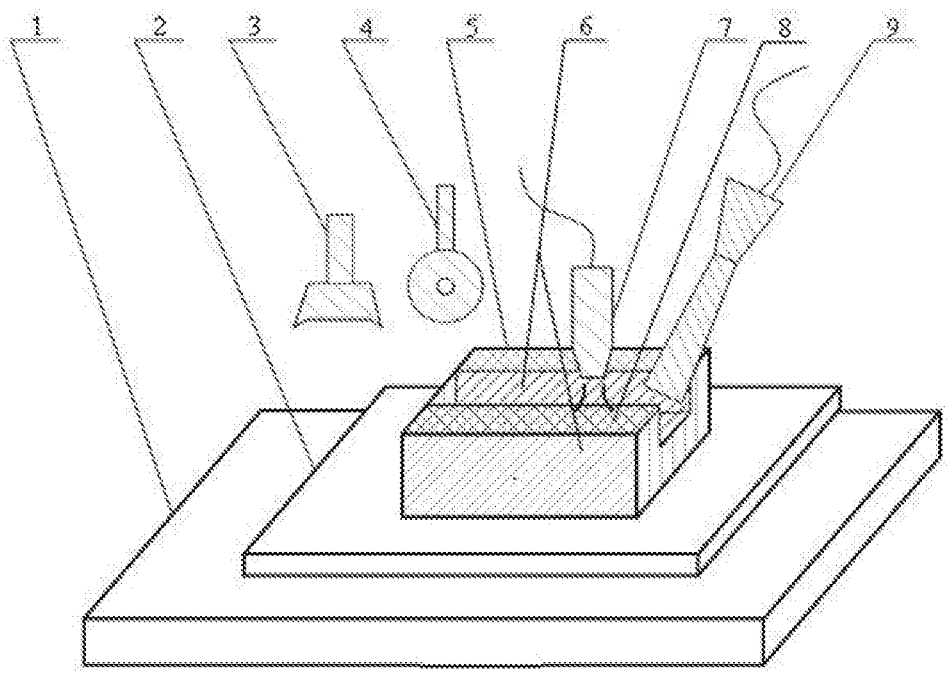
FIG. 2 is a schematic diagram of a forming system of hybrid AM and surface coating according to an example of the present invention.

An example of the present invention provides a forming system of hybrid additive manufacturing (AM) and surface coating. As shown in FIG. 2, the hybrid forming system includes an additive forming device 7, a laser-assisted cold spraying (LACS) device 9 and a workbench 1. The additive forming device 7 and the LACS device 9 are located above the workbench 1, and a substrate 2 is placed on the workbench 1. During manufacturing, the additive forming device 7 forms a part 5 to be formed on the substrate 2 layer by layer, and the LACS device 9 performs coating peening treatment on inner and outer surfaces 6 of the part to be formed during the forming process, thereby jointly completing the composite manufacturing of the part 5 to be formed.

Figure 3:
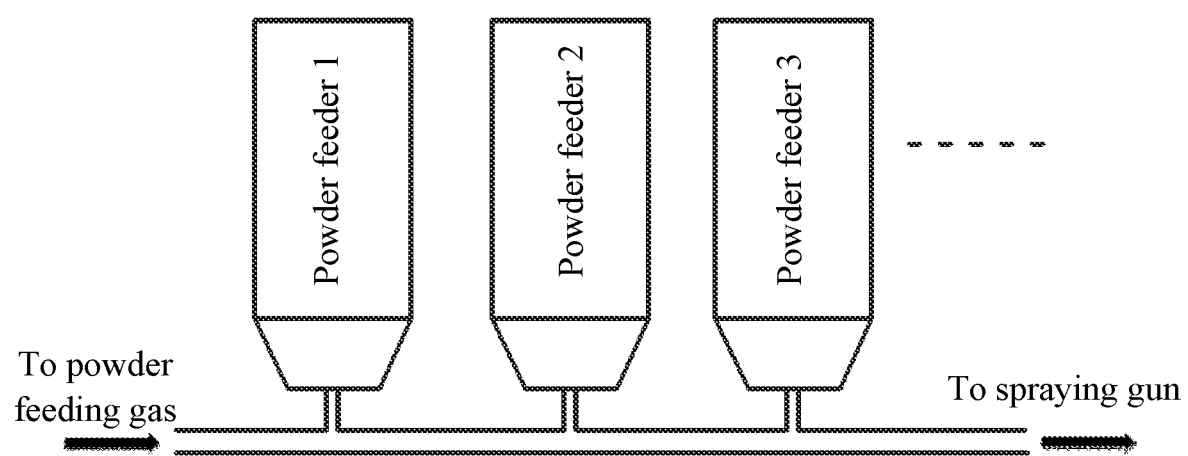
FIG. 3 is a structural diagram of servo powder feeding by a plurality of powder feeders according to an example of the present invention.

Specifically, as shown in FIG. 3, the LACS device 9 includes a gas compression and drying unit, a powder storage and feeding unit and a ring-shaped laser unit that are sequentially connected. During manufacturing, a coating powder material in the powder storage and feeding unit is compressed and dried by the gas compression and drying unit, sent to the ring-shaped laser unit, then heated by the ring-shaped laser unit, and coated on the inner and outer surfaces 6 of the part to be formed. More specifically, the ring-shaped laser unit includes an LACS gun for surface coating. The LACS gun is used to choose whether to use an auxiliary heating laser and power thereof according to different melting points of coating materials during the coating process, so as to realize the surface coating of materials with different melting points.

Preferably, the powder storage and feeding unit includes two or more powder storage and feeding tanks; a powder feeding rate of the powder storage and feeding unit is 40-70 g/min, a powder particle size is 5-60 μm, and a preheating temperature is 400-800° C.

Further, the hybrid forming device further includes a micro-rolling device 4 and a milling and grinding compound device 3; the micro-rolling device 4 and the milling and grinding compound device 3 are located above the workbench 1; the micro-rolling device 4 and the milling and grinding compound device 3 perform finish machining on the inner and outer surfaces 6 of the part to be formed during the process of forming the part 5 to be formed layer by layer by the additive forming device 7.

Specifically, the hybrid forming device is provided on a five-axis linkage machining center and cooperates with double gantries or mechanical arms to realize short-flow composite AM. The additive forming device 7, the micro-rolling device 4 and the milling and grinding compound device 3 are provided on one gantry or mechanical arm. They are each provided with a lifting device, so that they can work independently and freely switch to a required device. The LACS device 9 is provided on the other gantry or mechanical arm. The workbench 1 can rotate around a C-axis and turn around an A-axis of the machining center, so that a formed surface of the part 5 to be formed is perpendicular to the processing equipment during manufacturing, so as to achieve better forming quality and effect.

As shown in FIG. 1, a hybrid forming method using the above system specifically includes the following steps:

S1: Slice a three-dimensional (3D) computer-aided design (CAD) model of a part 5 to be formed into layers according to a geometrical shape of the part 5 to be formed and a requirement of a coating peening zone, obtain data of a plurality of slice layers, and preset an additive forming trajectory and a coating peening trajectory according to the data of the slice layers.

S2: Enable an additive forming device 7 to use a rapid prototyping method such as a laser arm or an electric arc to form a plurality of layers of the part 5 to be formed on a substrate 2 layer by layer according to the preset additive forming trajectory.

S3: Enable an LACS device 9 to perform coating peening treatment on inner and outer surfaces 6 of the part to be formed according to the preset coating peening trajectory. Specifically, during the coating process, an LACS gun needs to form a certain angle with a normal vector of a coated surface to ensure that the LACS gun does not interfere with the part 5 to be formed.

S4: Repeat S2 and S3 several times until the processing and manufacturing of the part is completed.

Further, in the forming process, the size, surface accuracy and density of the part 5 to be formed are detected in real time. When they fail to meet the preset requirements, the micro-rolling device 4 or the milling and grinding compound device 3 performs finish machining on the part 5 to be formed until the size and surface accuracy requirements of the part or mold are met.

The hybrid forming system and method are applicable to the manufacturing of various types of parts.

(1) The system can be used to coat copper or copper alloy on the surface of a high-strength steel part to enhance the surface lubrication and wear resistance of the part, so as to meet the requirements of the aerospace field for integrity, light weight, strength and stability of engines and other parts.

(2) The system is particularly suitable for the coating of functionally gradient materials (FGMs) and high melting point materials. It can be used to coat ceramic or ceramic metal materials on the surface of metal parts to produce metal parts with a gradient functional ceramic coating. Ceramic materials have the advantages of high melting point, wear resistance and corrosion resistance, but they are brittle and difficult to process, which makes them difficult to be used in the manufacture of high-performance materials. The different properties of ceramics from metals make them difficult to bond closely with metals. The poor physical compatibility of ceramic metal materials with metals makes them difficult to closely bond with metals.

It is easy for those skilled in the art to understand that the above described are only the preferred examples of the present invention, and are not intended to limit the present invention. Any modifications, equivalent substitutions and improvements made within the spirit and principles of the present invention should fall within the protection scope of the present invention.

What is claimed is:

1. A forming system of hybrid additive manufacturing (AM) and surface coating, comprising an additive forming device, a laser-assisted cold spraying (LACS) device and a workbench, wherein the additive forming device and the LACS device are located above the workbench; during manufacturing, the additive forming device forms a part to be formed on the workbench layer by layer, and the LACS device performs coating peening treatment on inner and outer surfaces of the part to be formed during the forming process, thereby jointly completing the composite manufacturing of the part to be formed;

wherein, the LACS device comprises a gas compression and drying unit, a powder storage and feeding unit and a ring-shaped laser unit that are sequentially connected; during manufacturing, a coating powder material in the powder storage and feeding unit is compressed and dried by the gas compression and drying unit, sent to the ring-shaped laser unit, then heated by the ring-shaped laser unit, and coated on the inner and outer surfaces of the part to be formed.

2. The forming system of hybrid AM and surface coating according to claim 1, wherein the powder storage and feeding unit comprises two or more powder storage and feeding tanks.

3. The forming system of hybrid AM and surface coating according to claim 1, wherein a feeding rate of the coating powder material of the powder storage and feeding unit is 40-70 g/min, a powder particle size is 5-60 μm, and a preheating temperature of the coating powder material is 400-800° C.

4. The forming system of hybrid AM and surface coating according to claim 1, further comprising a micro-rolling device and a milling and grinding compound device, wherein the micro-rolling device and the milling and grinding compound device are located above the workbench; the micro-rolling device and the milling and grinding compound device perform finish machining on the part to be formed during the process of forming the part to be formed layer by layer by the additive forming device.

5. A forming method of hybrid AM and surface coating, which is implemented by
using a forming system of hybrid additive manufacturing (AM) and surface coating, the forming system comprising an additive forming device, a laser-assisted cold spraying (LACS) device and a workbench, wherein the additive forming device and the LACS device are located above the workbench; during manufacturing, the additive forming device forms a part to be formed on the workbench layer by layer, and the LACS device performs coating peening treatment on inner and outer surfaces of the part to be formed during the forming process, thereby jointly completing the composite manufacturing of the part to be formed;
wherein, the LACS device comprises a gas compression and drying unit, a powder storage and feeding unit and a ring-shaped laser unit that are sequentially connected; during manufacturing, a coating powder material in the powder storage and feeding unit is compressed and dried by the gas compression and drying unit, sent to the ring-shaped laser unit, then heated by the ring-shaped laser unit, and coated on the inner and outer surfaces of the part to be formed;
the forming method comprising the following steps:
S1: presetting an additive forming trajectory and a coating peening trajectory according to a three-dimensional (3D) model of a part to be formed;
S2: enabling an additive forming device to form a multi-layer part to be formed on a workbench layer by layer according to the preset additive forming trajectory, and enabling an LACS device to perform coating peening treatment on inner and outer surfaces of the part to be formed according to the preset coating peening trajectory; and,
S3: repeating S2 several times until the manufacturing of the part is completed.

6. The forming method of hybrid AM and surface coating according to claim 5; wherein, the method includes
compressing and drying a coating powder material in the powder storage and feeding unit using the gas compression and drying unit;
sending the coating powder material to the ring-shaped laser unit;
heating the coating powder material with the ring-shaped laser unit; and,
coating the coating powder material on the inner and outer surfaces of the part to be formed.

7. The forming method of hybrid AM and surface coating of claim 6, wherein the compressing and the drying are performed in two or more powder storage and feeding tanks in the powder storage and feeding unit.

8. The forming method of hybrid AM and surface coating of claim 6, wherein the method further comprises:
configuring the powder storage and feeding unit to have a powder feeding rate ranging from 40-70 g/min;
selecting the coating powder material to have a particle size ranging from 5-60 μm; and,
preheating the coating powder material at a temperature ranging from 400-800° C.

9. The forming method of hybrid AM and surface coating according to claim 5, the method further comprising
using a micro-rolling device and a milling and grinding compound device; and,
performing finish machining on the part to be formed with the micro-rolling device and the milling and grinding compound device, wherein the finish machining is performed during the process of forming the part to be formed, the forming occurring layer by layer using the additive forming device.

\* \* \* \* \*